US009201667B2

(12) United States Patent
Ringdahl et al.

(10) Patent No.: US 9,201,667 B2
(45) Date of Patent: Dec. 1, 2015

(54) PROVIDING VIRTUAL DESKTOPS USING RESOURCES ACCESSED ON PUBLIC COMPUTER NETWORKS (75) Inventors: Kenneth Ringdahl, Pelham, NH (US); Steven Baron, Nashua, NH (US); Pranay Ahlawat, Milford, MA (US); Robert S. Becker, Concord, MA (US); Peter C. McKay, Medfield, MA (US)

(73) Assignee: VMware, Inc., Palo Alto, CA (US)

( * ) Notice: Subject to any disclaimer, the term of this patent is extended or adjusted under 35 U.S.C. 154(b) by 30 days.

(21) Appl. No.: 13/341,026

(22) Filed: Dec. 30, 2011

(65) Prior Publication Data

US 2012/0179820 A1    Jul. 12, 2012

Related U.S. Application Data (60) Provisional application No. 61/429,010, filed on Dec. 31, 2010.

(51) Int. Cl.
*G06F 15/173* (2006.01)
*G06F 9/44* (2006.01)
*G06F 9/445* (2006.01)

(52) U.S. Cl.
CPC .............. *G06F 9/4445* (2013.01); *G06F 8/63* (2013.01)

(58) Field of Classification Search
CPC .................................................... H04L 5/0035
USPC .......................................... 709/224, 225, 247
See application file for complete search history.

(56) References Cited

U.S. PATENT DOCUMENTS

| 7,912,822 | B2 * | 3/2011 | Bethlehem et al. | 707/705 |
|---|---|---|---|---|
| 2003/0195950 | A1 * | 10/2003 | Huang et al. | 709/219 |
| 2007/0300220 | A1 | 12/2007 | Seliger et al. | |
| 2008/0244028 | A1 * | 10/2008 | Le et al. | 709/208 |
| 2011/0004680 | A1 * | 1/2011 | Ryman | 709/224 |
| 2011/0113472 | A1 * | 5/2011 | Fung et al. | 726/3 |
| 2011/0185355 | A1 * | 7/2011 | Chawla et al. | 718/1 |
| 2011/0209064 | A1 * | 8/2011 | Jorgensen et al. | 715/733 |
| 2012/0311564 | A1 * | 12/2012 | Khalid | 718/1 |
| 2013/0007465 | A1 * | 1/2013 | Movassaghi | 713/186 |
| 2013/0125215 | A1 * | 5/2013 | London et al. | 726/4 |

OTHER PUBLICATIONS

"Virtual desktop", from Wikipedia, the free encyclopedia, available at: http://en.wikipedia.org/w/index.php?title=Virtual desktop &oldid=404752141 retrieved on Jul. 3, 2012, pp. 1-5.
International Search Report for PCT Patent Application No. PCT/US2011/068082, mailed on May 30, 2012, 6 pages.
Baratto, et al., "Mobidesk: Mobile Virtual Desktop Computing", Proceeding MobiCom '04 Proceedings of the 10th annual international conference on Mobile computing and networking, 2004, pp. 1-15.

(Continued)

*Primary Examiner* — Hassan Kizou
*Assistant Examiner* — Abdelnabi Musa (57) ABSTRACT A computer system supports hosting of virtual desktops using resources available in the cloud. Connections to various resources used by a desktop configuration are made dynamically using authentication information associated with the user assigned to the desktop configuration. In addition to using file storage, directory services and user management information on private resources on a private network, these resources may also be accessed through a public network.

14 Claims, 10 Drawing Sheets (56) References Cited

OTHER PUBLICATIONS

Written Opinion for PCT Patent Application No. PCT/US2011/068082, 10 pages.

International Preliminary Examination Report for PCT Patent Application No. PCT/US2011/068082, 11 pages.

Bhowmik, et al., "Managing responsiveness of virtual desktops using passive monitoring", International Symposium on Integrated Network Management, Jun. 1-5, 2009, pp. 319-326.

* cited by examiner

PROVIDING VIRTUAL DESKTOPS USING RESOURCES ACCESSED ON PUBLIC COMPUTER NETWORKS

CROSS REFERENCE TO RELATED APPLICATIONS

This application is a nonprovisional application of, and claims priority to and the benefits under 35 U.S.C. §119 of, U.S. Provisional Patent Application 61/429,010, filed Dec. 31, 2010, entitled PROVIDING VIRTUAL DESKTOPS USING RESOURCES ACCESSED ON PUBLIC COMPUTER NETWORKS, which is hereby incorporated by reference.

BACKGROUND

There has been an increasing interest on the part of both businesses and consumers to find a way to reduce their capital expenditures on computer equipment and resources. This interest is being met by service providers who offer computer equipment and resources on an as needed basis over a computer network. This model of computing is commonly referred to as "cloud computing." Cloud computing has been defined by the National Institute for Standards and Technology as a "model for enabling convenient, on-demand network access to a shared pool of configurable computing resources (e.g., networks, servers, storage, applications and services) that can be rapidly provisioned and released with minimal management effort or service provider interaction."

In common business configurations, a service provider establishes a private computer network, accessible only to an enterprise through the enterprise's own private computer network. In general, a portion of the service provider's computer network becomes an extension of the enterprise's computer network and the resources and the connections with them are generally static. In these configurations, the service provider may provide storage, server resources, electronic mail servers, and even desktop configurations for access by the enterprise. In other words, the enterprise extends its network to the service provider data center or into the cloud.

In some configurations, the service provider has a resource, such as storage, that an enterprise or individual can access over a public computer network such as the Internet. Such configurations have more security issues due to the openness of the computer network through which they are accessed.

The National Institute for Standards and Technology recognizes three service models for using cloud computing: software as a service, platforms as a service and infrastructure as a service. The complete definition by NIST is the following:

Cloud computing is a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of five essential characteristics, three service models, and four deployment models.

Essential Characteristics:

On-demand self-service. A consumer can unilaterally provision computing capabilities, such as server time and network storage, as needed automatically without requiring human interaction with each service's provider.

Broad network access. Capabilities are available over the network and accessed through standard mechanisms that promote use by heterogeneous thin or thick client platforms (e.g., mobile phones, laptops, and PDAs).

Resource pooling. The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity. Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured Service. Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models:

Cloud Software as a Service (SaaS). The capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Cloud Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly application hosting environment configurations.

Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models:

Private cloud. The cloud infrastructure is operated solely for an organization. It may be managed by the organization or a third party and may exist on premise or off premise.

Community cloud. The cloud infrastructure is shared by several organizations and supports a specific community that has shared concerns (e.g., mission, security requirements, policy, and compliance considerations). It may be managed by the organizations or a third party and may exist on premise or off premise.

Public cloud. The cloud infrastructure is made available to the general public or a large industry group and is owned by an organization selling cloud services.

Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Another service model that can be supported using cloud computing is cloud Desktops as a Service (DaaS). A computer system supports hosting of virtual desktops using resources in the cloud. Connections to various resources used by a desktop configuration can be made dynamically using authentication information associated with the user assigned to the desktop configuration. The computing platforms, file storage, directory services and user management information used by the desktop can reside on private resources on a private network, or on resources that are accessed through a public network.

Such desktops can be made available to users on demand using ubiquitous network access. A service provider can provide desktops for multiple tenants using the same cloud resources. Performance can be monitored to satisfy service level agreements.

Providing Desktops as a Service in the cloud is a challenging problem because desktop workloads are input and output intensive and write intensive. Security is individualized due to the nature of the resources being accessed by each user, different policies and compliance rules, and user personal preferences. Also, desktops in the cloud are typically derived from a common template, called a pattern, which may allow all cloud resources (storage, processing, networking and memory) to be managed more efficiently. The performance management capabilities and operational practices for providing acceptable service to very large populations of virtual desktops are significant.

To allow multiple desktop configurations to be run on host computers in the computer system (whether within service provider resources or through integration with a public or private cloud), a hypervisor is installed on each host computer. A resource manager selects which resources to use based on availability and the needs of the desktop configuration. In this context, the resource manager has a common interface providing an abstraction layer from the specifics of the underlying implementations. By using a common interface, multiple hypervisors or cloud platforms can be integrated without impacting the dependent components. Notably, some platforms provide direct access to storage, while others do not. In the latter case, the resource manager handles direct access to the storage resources, and provides access information to the virtual desktop that will use that storage. Using such a resource manager, desktop provisioning can be done independently of the type of hypervisor or cloud platform being used to manage the host computer resources. The resource manager APIs can be implemented using a generic parent object API for a resource, and then child object APIs for each specific implementation of that resource.

A desktop configuration manager prepares patterns, i.e., the computer code that defines the desktop, and provides them to the resource manager to create desktop configurations for users. The desktop configuration manager receives an indication of the desired operating system, applications, and other resources for the desktop. These are combined with configuration information to create a "gold" pattern. The resource manager uses the gold pattern to create a pool of desktops using license keys, available memory and CPU resources, dynamic or static resources, etc. An agent program seals the desktop pattern by injecting the "SYSPREP" program, or other system preparation tool for operating system deployment, into the gold pattern.

From this perspective, the NIST definition of cloud computing could be expanded to include two more characteristics and one more model as follows:

The additional characteristics are:

Pattern Syndication. A computer system image, containing operating systems and installed applications, can be formed into a master template or pattern from which virtual machines can be derived. Virtual machines associated with a common pattern can be managed collectively for mutual benefit to improve performance or utilization of measured service resources (e.g., storage, processing, and memory).

Individualized Security. The security context of a cloud resource or service (e.g., storage, user accounts, and applications) will be determined by a combination of factors. Examples of such factors include service or business policies, compliance and regulatory considerations, as well as personal information or usage preferences.

The new model is Cloud Desktops as a Service (DaaS). The capability is provided to provision cloud resources where the consumer is able to deploy and run desktop operating systems, including applications and personal productivity tools. These desktops are accessible from various client devices through use of a remote graphics display protocol (e.g., RDP). The consumer does not manage or control the underlying cloud infrastructure, but has control over the contents of the desktop system image, and possibly limited control of select networking and utility servers which support the desktops (e.g., authentication, directory, file sharing, email servers).

DESCRIPTION OF THE DRAWINGS

FIG. 6 is a more detailed block diagram of an example implementation of the system of FIG. 4.

DETAILED DESCRIPTION

In the following description, reference is made to the accompanying drawings, which form a part thereof, and which show by way of illustration various example implementations. It is to be understood that other embodiments may be utilized and structural changes may be made without departing from the scope of the claimed subject matter.

Figure 1:
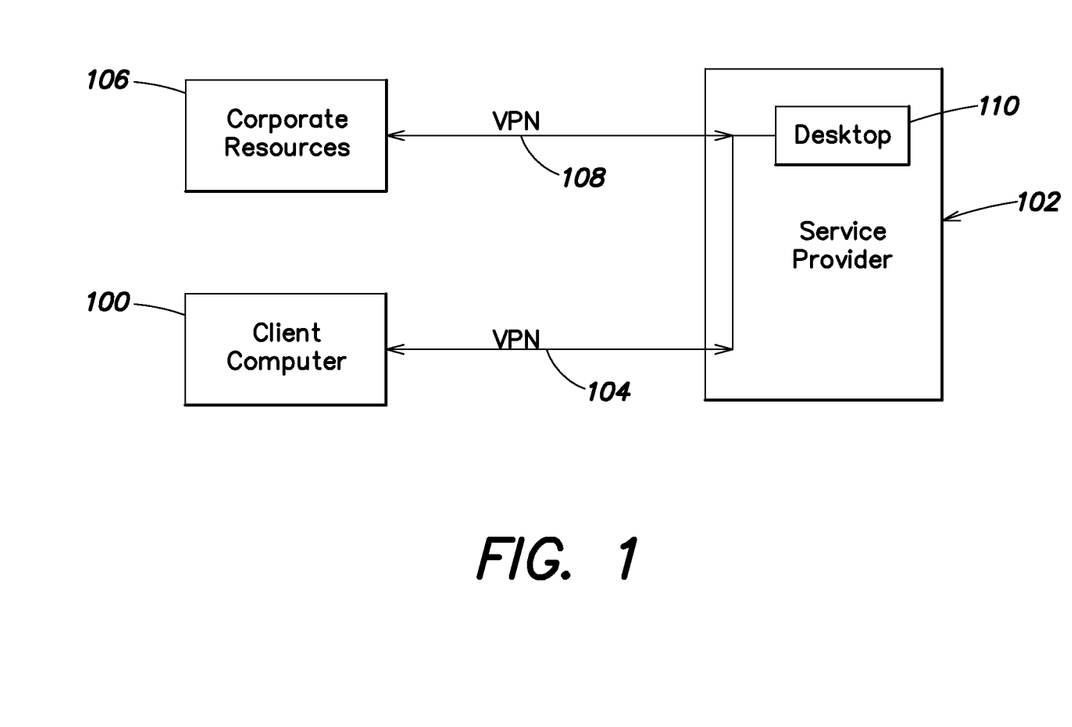
FIG. 1 is a diagram of an example system which hosts computer applications using privately-controlled resources.

Referring now to FIG. 1, an implementation of a service provider is shown. In particular, a client access device 100 accesses the service provider resources 102, typically through a virtual private network 104. The client access device can be any computing device used to access the network and send and receive communications with the service provider resources, such as any general purpose computer, thin client, or mobile device. Corporate resources 106, such as an email server, storage or other resource maintained by an enterprise, also is accessed through a virtual private network 108. The service provider resources include one or more host machines on which one or more desktop configurations 110 are hosted, the input and output for which is provided to and from the client access device 100, and which access the corporate resources 106.

Figure 2:
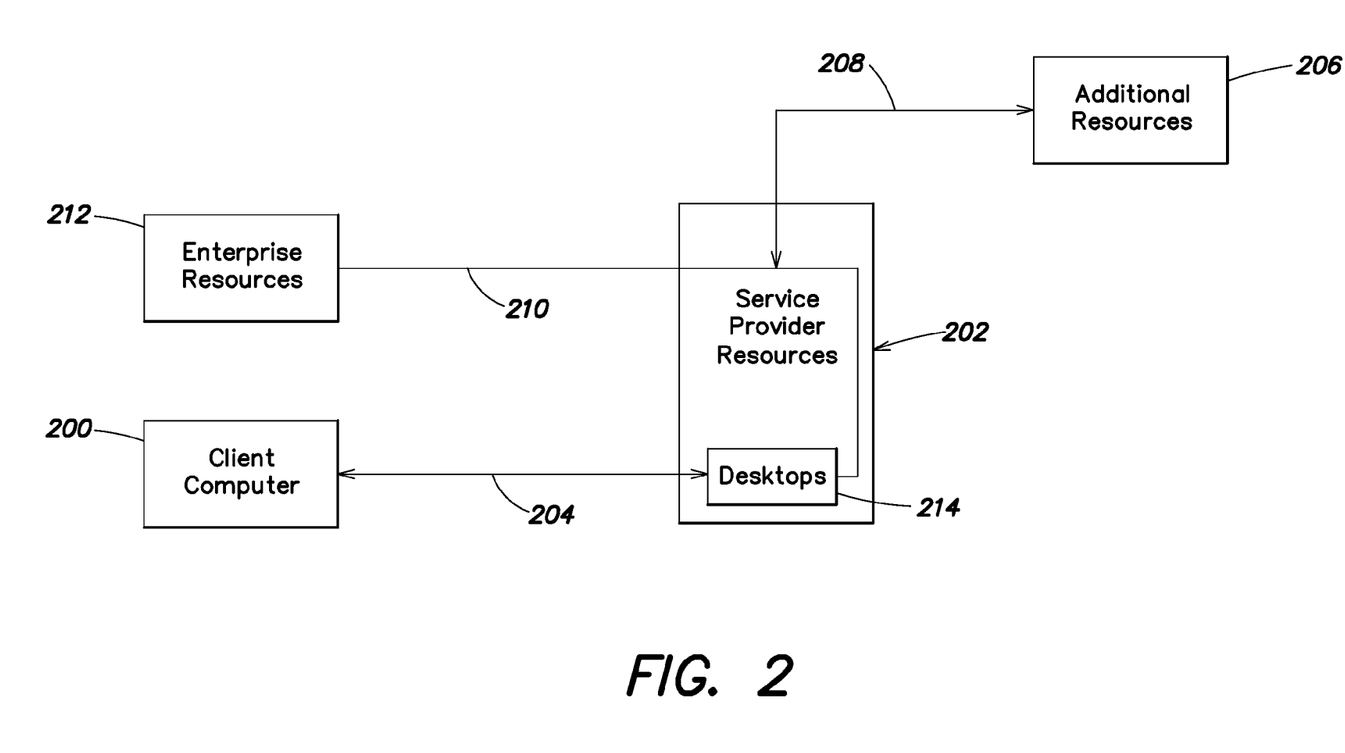
FIG. 2 is a diagram of an example system which hosts computer applications using resources accessed over a publicly accessible computer network.

Referring now to FIG. 2, a computer system supports hosting of desktops using resources available over a publicly accessible computer network is shown. A client access device 200, for example, the computer used by an employee of an enterprise, accesses the service provider resources 202, typically through a virtual private network 204. Additional resources 206, such as an email server, storage or other resource maintained by an enterprise, are accessed over a public network 208. The service provider resources include one or more host machines on which one or more desktop configurations 214 are hosted, and which access the additional resources 206. The connection to the additional resources 206 is dynamic and involves an authentication process because the connection is over a public computer network such as the Internet. Such additional resources may include an email account, remote storage, applications, domain controllers, directory services, file shares, account management resources, Active Directory for a Microsoft server, and license servers such as key management server for Microsoft applications. Some of these additional resources may remain accessible through the enterprise network 210, as indicated at 212.

Figure 3:
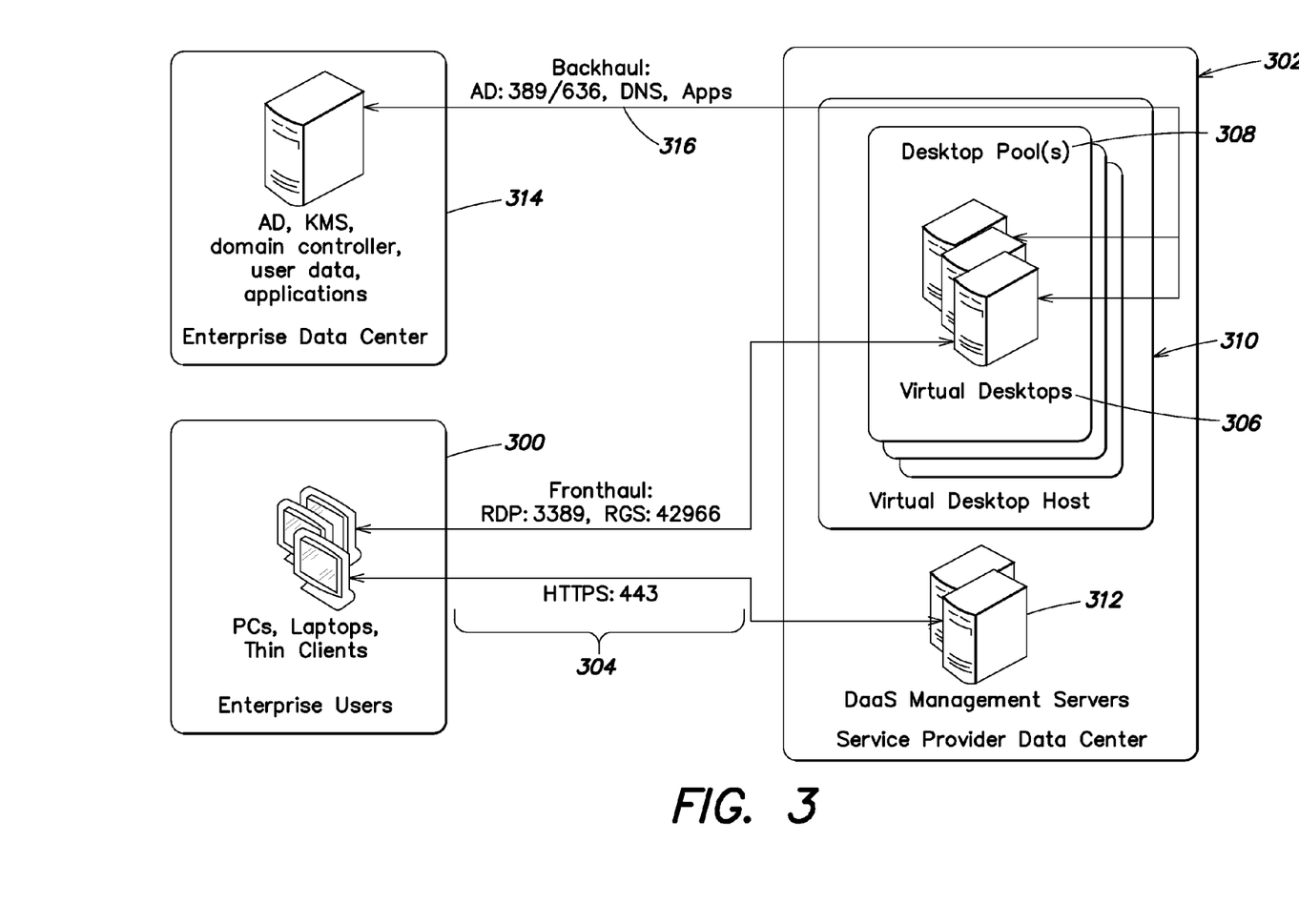
FIG. 3 is a more detailed block diagram of an example implementation of the system of FIGS. 1 and 2.
Figure 4:
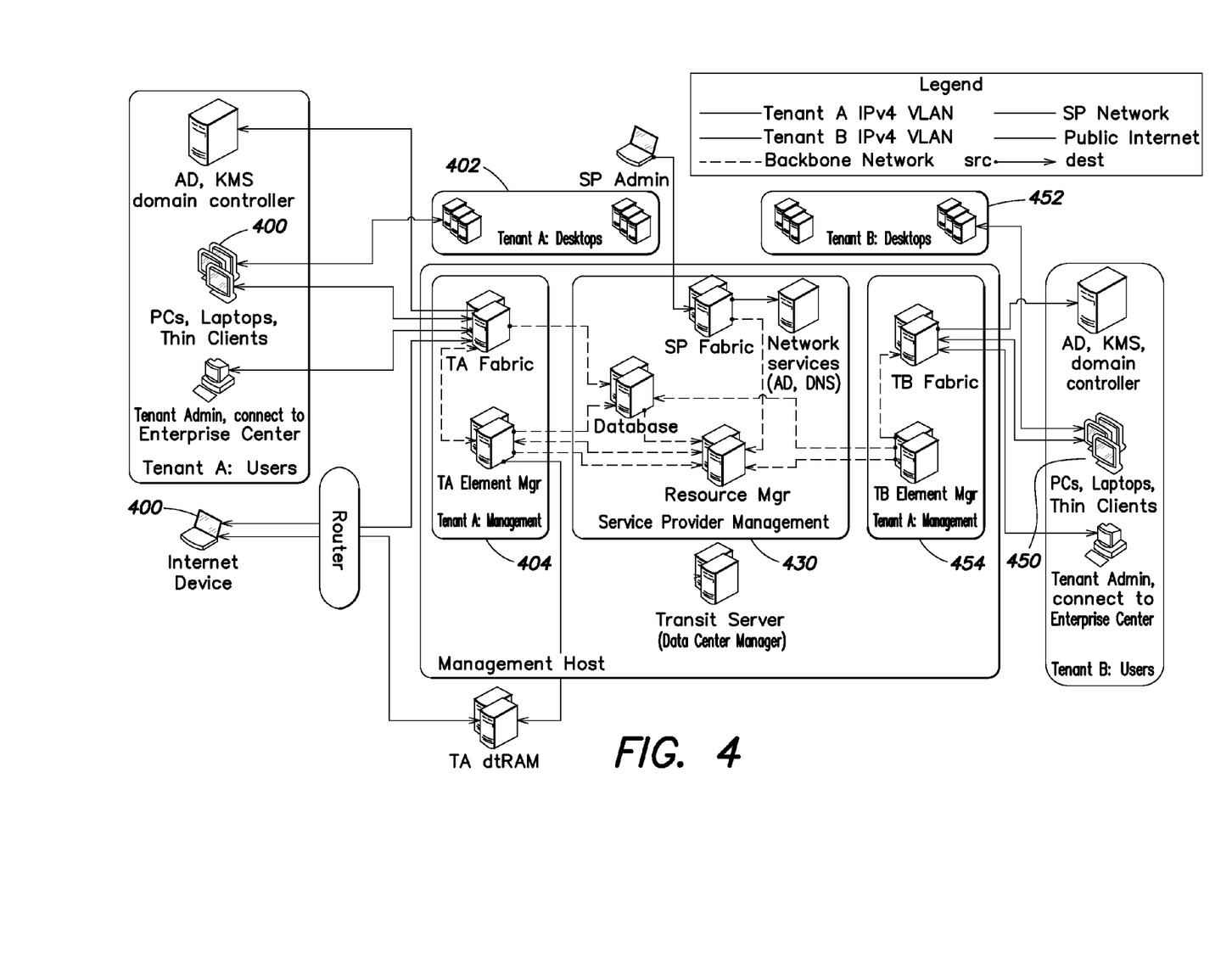

Referring now to FIG. 3, more details of such an implementation are shown. In particular, the enterprise users access service provider resources 302 through various client machines 300, over the network 304. The remote graphics display protocol connection between the client access devices 300 and the virtual desktops 306 in a pool 308 of desktop configurations on one or more host machines 310 can be provided by, for example, an RDP:3389 or RGS:42966 connection where the network 304 is a private network. In installations where the network 304 is a public network and providing remote access for users, the system includes a remote access manager that allows for a secure protocol and/or tunnel for communication between the client access device 300 and the remote access manager, which in turn communicates with the virtual desktops using the RDP:3389 or RGS:42966 connections. The service provider resources include a management server 312 that presents a self-service administrative user interface and that manages the host machines 310 to provide the virtual desktops. The connection between the client access devices 300 and the management server 312 is an HTTPS:443 connection. Each of the virtual desktops can access enterprise resources 314 that may be hosted either within the enterprise's network or over a public network 316.

The service provider resources may be placed at more than one physical location, and these locations may be interconnected by the service provider's network. Each location may include one or more hypervisors, each of which can host one or more virtual desktops. In addition to hypervisors, the locations could also host private clouds or external integrations with public clouds can be made.

Connections to the additional resources used by a desktop configuration are made dynamically using authentication information associated with the user assigned to the desktop configuration. The authentication authority is typically private to each enterprise, but may also be a public network authority. The user may be prompted for authentication information when accessing these resources while using the virtual desktop. Alternatively, the virtual desktop, as part of its initialization, may access such resources and provide authentication information.

Figure 5A:
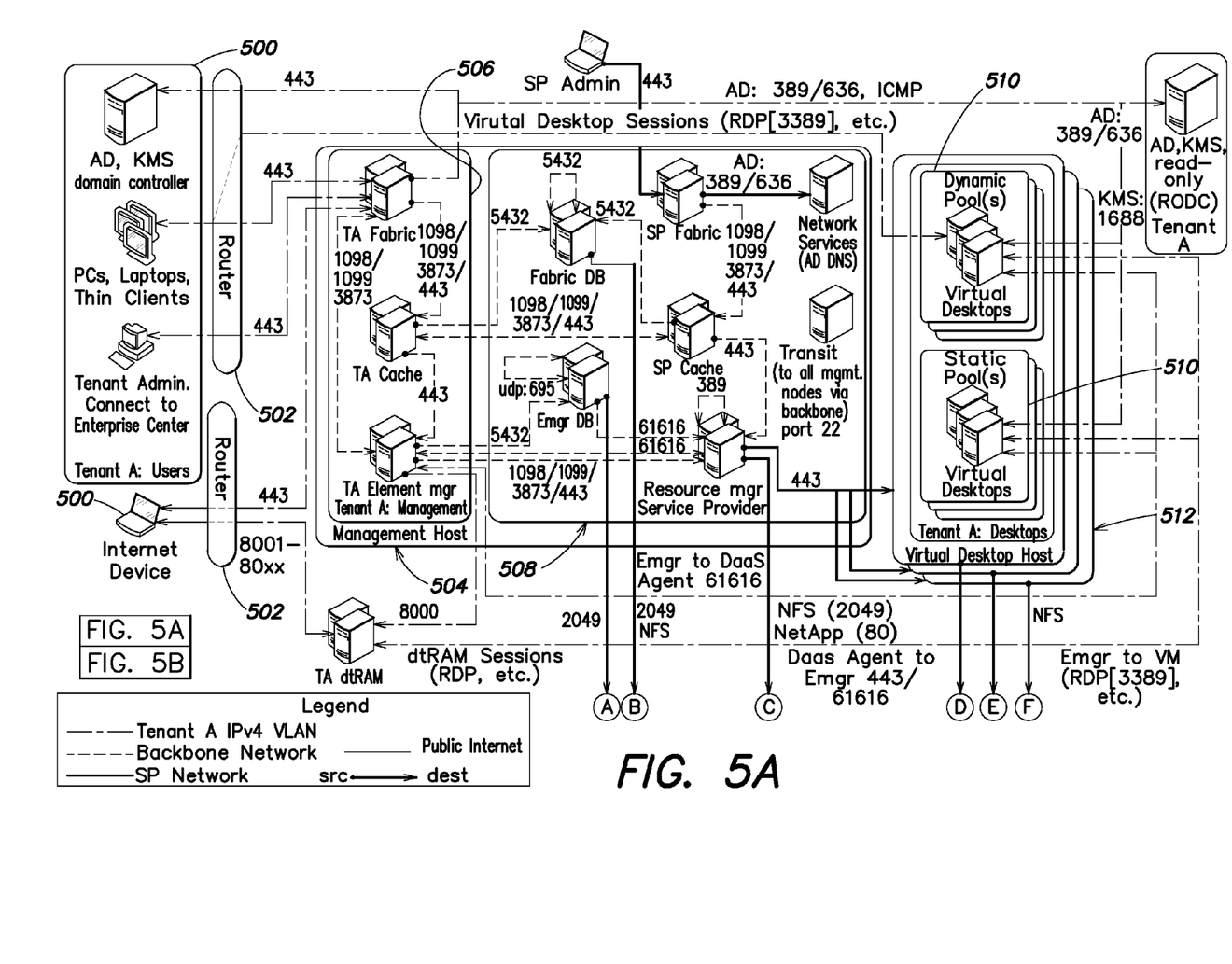
FIGS. 5A-5B are a more detailed block diagram of an example implementation of the system of FIG. 3.
Figure 5B:
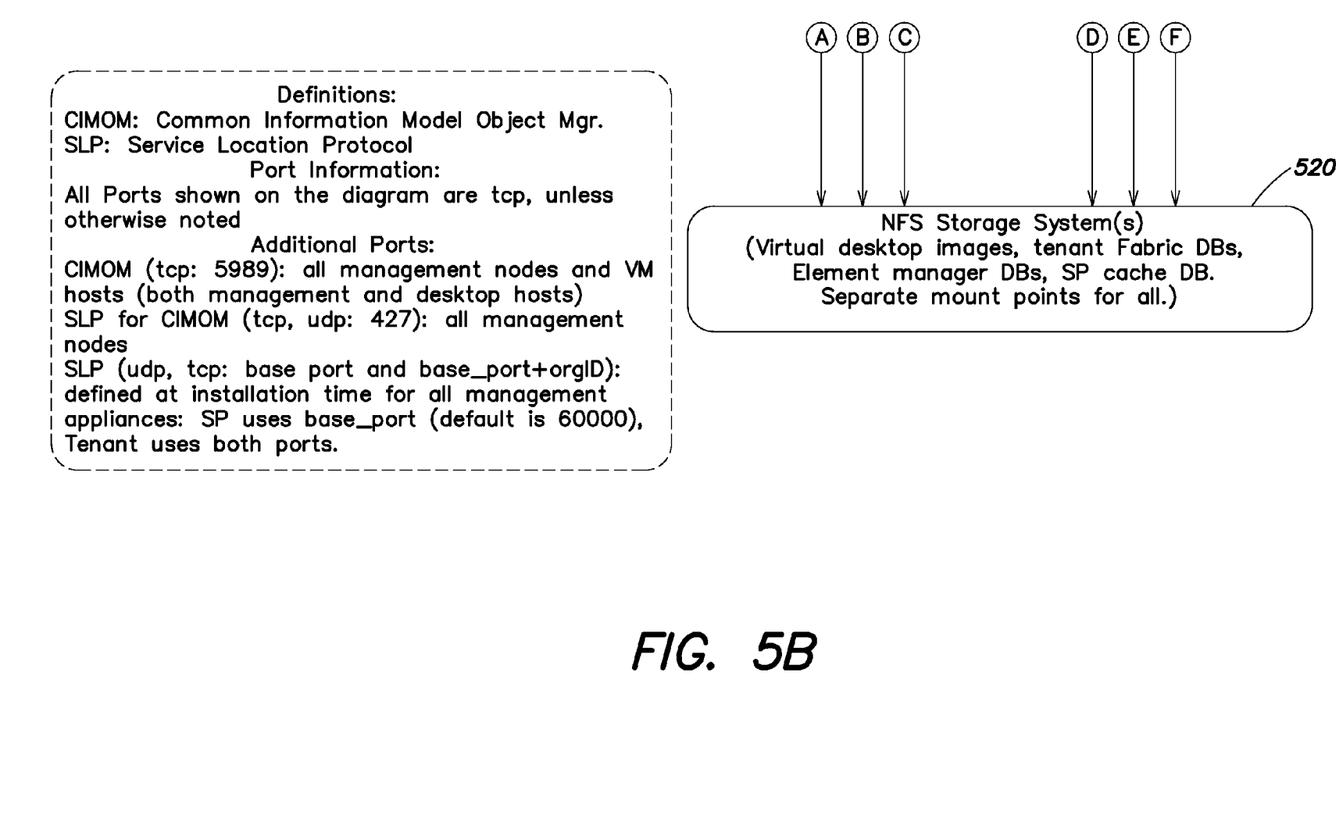
Figure 6A:
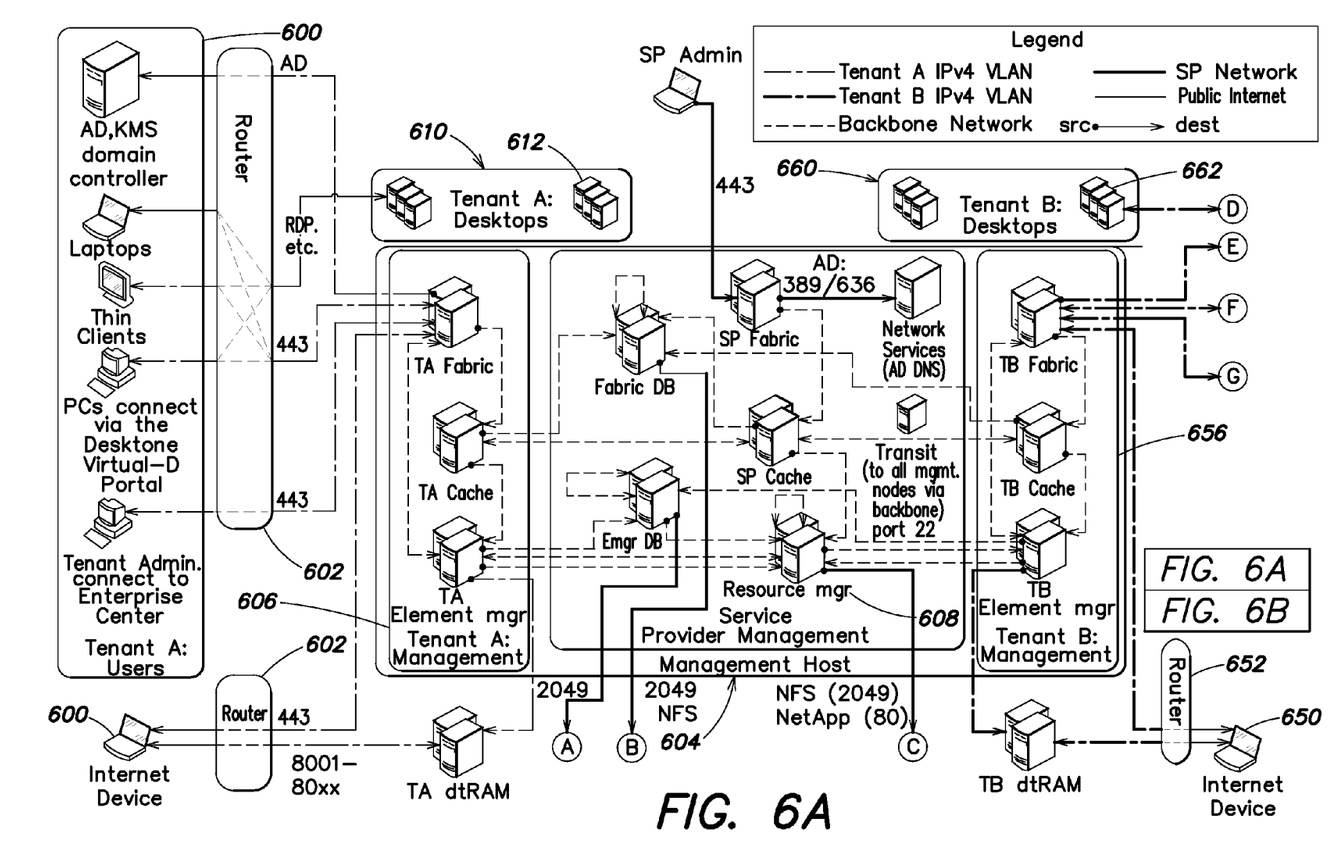
FIGS. 6A-6B are a more detailed block diagram of an example implementation of the system of FIG. 4.
Figure 6B:
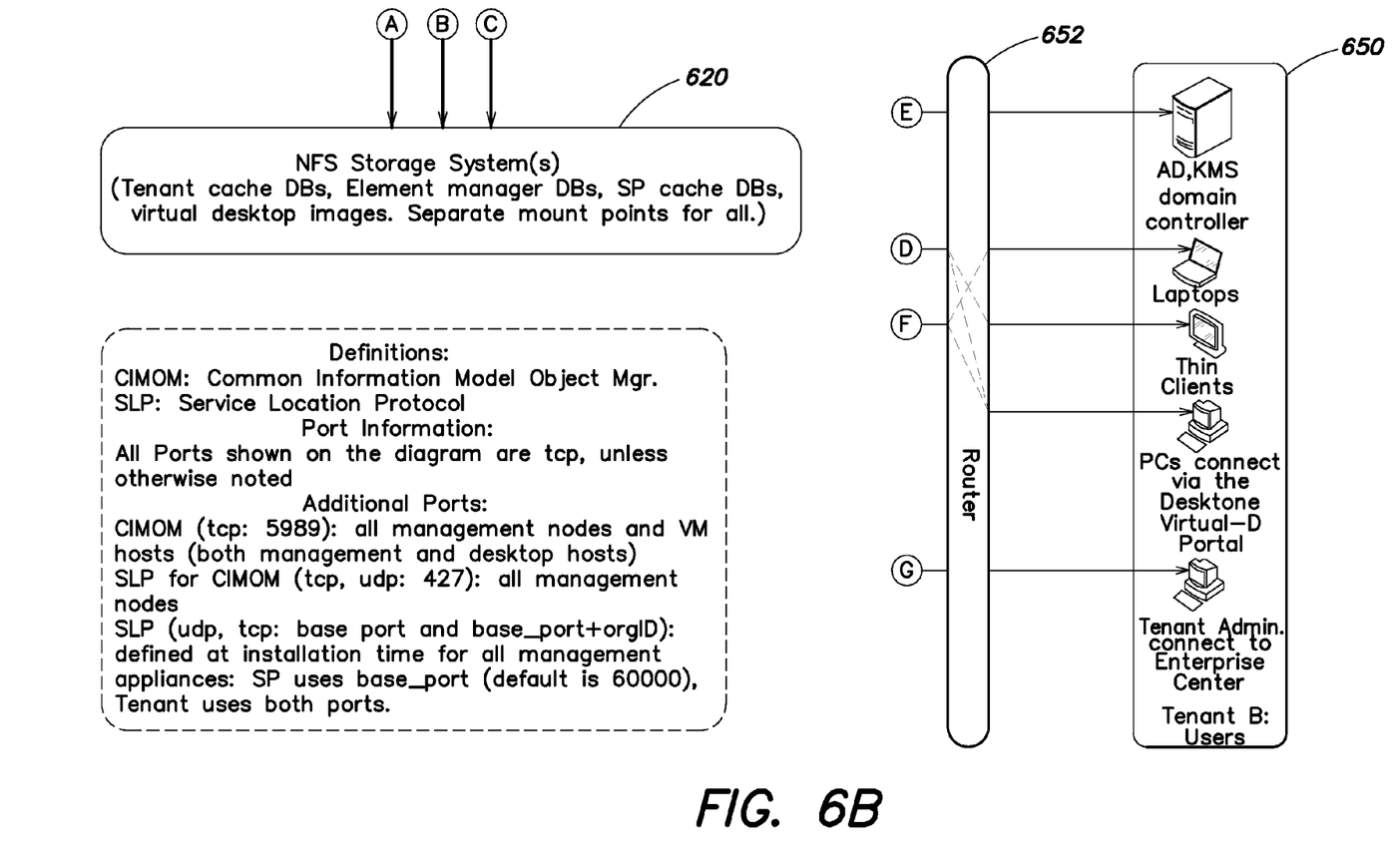

More details of a single tenant implementation are shown in FIGS. 5A-5B, whereas a multitenant implementation is shown in FIGS. 6A-6B.

In FIGS. 5A-B, users for a first tenant access the service provider using tenant computers (designated at 500) connected to routers 502. The service provider includes a management host 504. The management host 504 includes tenant resources, particularly a tenant management system 506, and service provider resources, particularly, a resource manager 508. The tenant management system 506 accesses virtual desktops 510 on host machines 512. The resource manager 508 accesses the host machines 512 to allocate resources for the virtual desktops 510, but otherwise does not have access to the virtual desktops 510. The virtual desktops 510 can access one or more storage systems 520. The tenant management system 506 can access the storage; the resource manager 508 can allocate storage to a tenant, but does not have access to the storage itself.

Similarly, in FIGS. 6A-B, users for a first tenant access the service provider using tenant computers (designated at 600) connected to routers 602. The service provider includes a management host 604. The management host 604 includes tenant resources, particularly a tenant management system 606, and service provider resources, particularly, a resource manager 608

Similarly, in FIG. 6, users for a first tenant access the service provider using tenant computers (designated at 600) connected to routers 602. The service provider includes a management host 604. The management host 604 includes tenant resources, particularly a tenant management system 606, and service provider resources, particularly, a resource manager 608.

Users for a second tenant access the service provider using tenant computers (designated at 650) connected to routers 652, to connect to management host 604. The management host 604 also includes tenant resources for the second tenant, particularly a second tenant management system 656. The same resource manager 608 can be used by the service provider for managing the resources of both tenants.

The first tenant management system 606 accesses virtual desktops 610 on host machines 612. The second tenant management system 656 accesses virtual desktops 660 on host machines 662. The resource manager 608 accesses the host machines 612, 662 to allocate resources for the virtual desktops 610, 660, but otherwise does not have access to the virtual desktops 610, 660.

The virtual desktops 610,660 can access one or more storage systems 620. The tenant management systems 606, 656 can access the storage; the resource manager 608 can allocate storage to a tenant, but does not have access to the storage itself.

The host machines 512, 612 for running the virtual desktops can be provided within the service provider resources, or might also be accessible by the management system (within the service provider resources) but over a computer network from another service provider. In this case, the management system may need to be able to communicate with and manage different resources, depending on the hypervisors or cloud platforms used by the host machines being accessed.

To allow multiple desktop configurations to be run on host computers in the computer system (whether within service provider resources or through integration with a public or private cloud), a hypervisor is installed on each host computer. A resource manager selects which resources to use based on availability and the needs of the desktop configuration. In this context, the resource manager has a common interface providing an abstraction layer from the specifics of the underlying implementations. By using a common interface, multiple hypervisors or cloud platforms can be integrated without impacting the dependent components. Notably, some platforms provide direct access to storage, while others do not. In the latter case, the resource manager handles direct access to the storage resources, and provides access information to the virtual desktop that will use that storage. Using such a resource manager, desktop provisioning can be done independently of the type of hypervisor or cloud platform being used to manage the host computer resources.

Other kinds of resources, such as storage, also have an API for the resource manager to manage access to them. The API includes such interactions such as authentication, volume or file duplication, and capacity management. A similar abstraction layer is used here to obscure the specifics of the individual storage systems from the components requiring access to storage resources.

Figure 7:
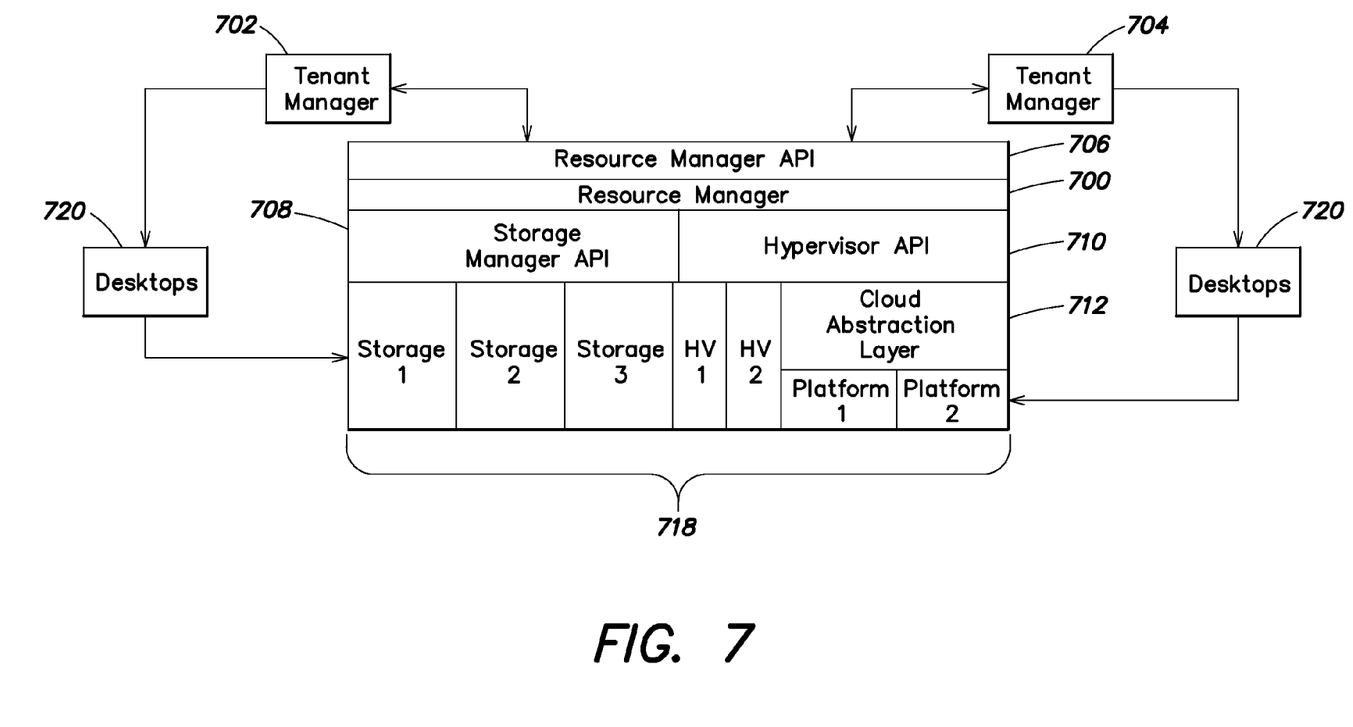
FIG. 7 is a diagram illustrating layers of the resource manager APIs.

Referring to FIG. 7, such an architecture for a resource manager is shown. In this example, the resource manager 700 is accessed by tenant manager systems 702 and 704 through a resource manager API 706. The tenant manager systems 702 and 702 use the resource manager to manage the inventory of available host machines, desktops and storage, and allocate these resources 718 for desktops 720 in response to requests for desktop resources from users. The resource manager accesses storage through a storage manager API 708. Access to different hypervisor platforms is provided through a hypervisor API 710. The hypervisor API incorporates a cloud abstraction layer 712 that provides access to various cloud platforms, such as the OPENSTACK, VCLOUD and AMAZON EC2 cloud platforms. The APIs 708, 710 and 712 can be built be defining a generic parent object API as an abstraction layer for each resource type, such as all hypervisors, storage, or cloud platforms as the case may be, and the specific API for a specific implementation of that resource, whether a hypervisor, storage or cloud platform, as a child object of that parent API of that resource type. The cloud platform API can be implemented as a child object of the generic hypervisor API.

Given the APIs to access the hypervisors and storage in the cloud as well as at the service provider, resources for desktops can be allocated and the desktops created using the tenant management systems and resource manager.

Figure 8:
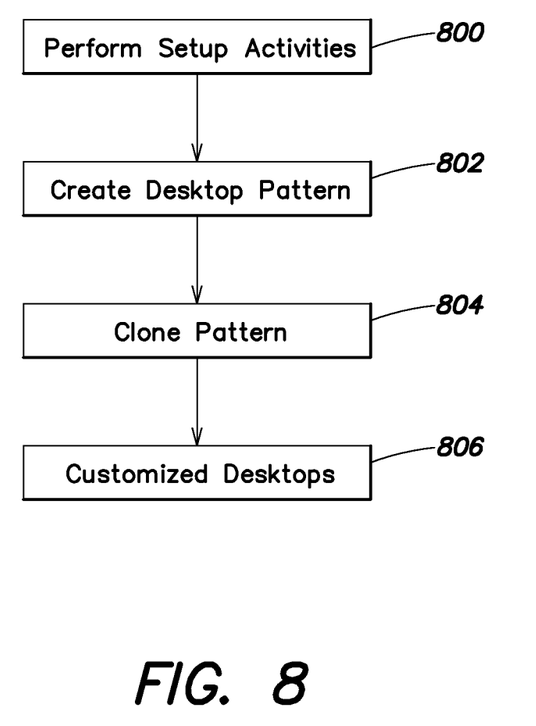
FIG. 8 is a flowchart describing provisioning of desktops.

To provision a desktop, there are four general categories of activity to be performed. As shown in FIG. 8, first, setup activities are performed 800 to ensure that the resources (host machines and storage and their respective operating systems and file systems) are available and configured properly. Second, system preparation activities are performed 802 to create a desktop pattern, i.e., the computer code that defines the desktop. Third, cloning activities are performed 804, to copy the desktop pattern to different host machines tied together with hardware, memory and other customizations. Fourth, post-cloning customization activities 806 are performed to customize each desktop.

To create a desktop pattern, a desktop configuration manager prepares the pattern and provides it to the resource manager to create desktop configurations for users. This process is called pattern syndication. More particularly, the desktop configuration manager receives an indication of the desired operating system, applications, and other resources for the desktop. These are combined with configuration information to create a "gold" pattern. The resource manager uses the gold pattern to create a set of desktops using license keys, available memory and CPU resources, dynamic or static resources, etc. An agent program seals the desktop pattern according to the operating system type by inserting a system preparation tool for operating system deployment. For example, the desktop pattern for a WINDOWS environment is sealed by injecting the "SYSPREP" program into the gold pattern. A LINUX operating system pattern is "sealed."

After the gold pattern is created, it can then be cloned, or copied, to the various host machines for which it was prepared. Upon installation, the system preparation tool (e.g., "SYSPREP" in Windows) is executed and the desktop pattern is configured on the host machine.

After such cloning and installation, various post-cloning customizations can be performed for a desktop. For example, various user-level file system and operating system configuration changes can be made, such as host name changes, time zone manipulations, and the like.

As a particular example of post-cloning customization, when a desktop is activated, a domain join process is performed. This process involves having the desktop join a network domain. For example, the desktop obtains a network address from the domain server for the enterprise for which the desktop is allocated. This domain server is accessible because the desktop is allocated on a machine that is placed on the virtual local area network allocated to the enterprise. After the desktop has joined the tenant's network, it can access the resources available to that tenant.

By following such a work flow—where a gold pattern is created, followed by cloning of that pattern—desktops can be provisioned on multiple hypervisors, clouds or platforms and access them uniformly. This solves many challenges that enterprises face when provisioning desktops.

Other enhancements can be provided in such installations. For example, desktops can be migrated to optimize individual user experience metrics. In particular, this migration can be performed by the system if the platform is able to collect hardware and hypervisor agnostic user experience metrics from each server, as well as geography and network location information. Given this performance management information, the service platform can re-locate or re-organize virtual desktops in such a way to ensure users have the best experience possible or to consolidate desktops on a minimum number of servers to reduce costs while maintaining a service level agreement.

As another example, desktops can be allocated based on projected user performance. When resources allow for assigning a users' desktop to one of multiple hosts, the platform that is projected to provide the user with the best user experience can be selected. Such an assignment can be hypervisor and hardware agnostic or can even be done on private or public clouds. This selected can be performed based on hypervisor agnostic user experience metrics from a syndicated pool of desktops. The process that assigns the user to a resource makes the assignment based on which available resource is reporting the best user experience metrics. Such a process would allow a vendor to have a mix of hypervisors and various grades of dissimilar hardware or even private and public clouds and still make appropriate allocations to meet their service level agreements. Likewise such an allocation scheme can also alert the service provider when allocations are at risk of not meeting a service level agreement by providing the service provider with an early warning of insufficient capacity.

A hypervisor and cloud platform agnostic user experience metric can be provided by creating a sleep timer of fixed length. An agent can then time how long it takes to respond to the timer. The delta between the actual response time and the sleep time is a close measure of the desktops responsiveness to keyboard and mouse movements. A variety of other kinds of platform agnostic user experience metrics can be used, and the invention is not limited to a particular metric.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer system comprising:
   a computer hosting a management system for a service provider to provision virtual desktops and manage access, by a plurality of users using client access devices, to the virtual desktops hosted on one or more host machines on a first computer network, wherein a user among the plurality of users is assigned to a virtual desktop among the virtual desktops hosted on the host machines;
   wherein the virtual desktops are allocated one or more additional resources located on a second computer network and accessed by the virtual desktops over a public computer network, each virtual desktop using authentication information for authentication with and connection to the additional resources, wherein the authentication information used by each virtual desktop is associated with the user assigned to the virtual desktop; and
   wherein access to the additional resources on the second computer network by the client access devices occurs through the virtual desktops on the host machines using the authentication information associated with the user assigned to the virtual desktop; and
   wherein the management system derives virtual desktops from a common template, wherein the common template defines the virtual desktop, including an operating system, applications, indications of the additional resources for the virtual desktop, and configuration information, and wherein the management system creates the virtual desktops for the users using one or more license keys, available memory of the host machines, processing resources of the host machines, and the indications of the additional resources.

2. The computer system of claim 1, wherein the virtual desktops comprises:
   virtual desktops on one or more host machines on a service provider management computer network; and
   virtual desktops on one or more host machines connected to a computer network that is a separate computer network than the service provider managed computer network.

3. The computer system of claim 2, wherein the management system allows the service provider to allocate resources for multiple tenants using both the service provider managed host machines and the host machines on the separate computer network.

4. The computer system of claim 1, wherein the host machines reside in a plurality of independent data centers.

5. The computer system of claim 4, wherein the management system allows the service provider to allocate resources for each of multiple tenants using the host machines in the plurality of data centers.

6. The computer system of claim 4, wherein the management system allows the service provider to allocate resources for each of multiple tenants using the host machines in the plurality of independent data centers.

7. A computer system providing virtual desktops in a cloud computing model, comprising:
   a plurality of remote host machines, each hosting a plurality of virtual desktops, wherein a user among a plurality of users is assigned to a virtual desktop among the virtual desktops hosted on the host machines,
   wherein the host machines include host machines on a service provider managed computer network and on a first computer network that is separate from the service provider managed computer network;
   wherein the virtual desktops are allocated one or more additional resources located on a second computer network and accessed by the virtual desktops remotely over a public computer network, each virtual desktop using authentication information for authentication with and connection to the resources, wherein the authentication information used by each virtual desktop is associated with the user assigned to the virtual desktop; and
   a computer hosting a management system for a service provider to provision virtual desktops and manage access by the plurality of users using remote client access devices to the virtual desktops;
   wherein access to the additional resources on the second computer network by the remote client access devices occurs through the virtual desktops on the host machines using the authentication information associated with the user assigned to the virtual desktop; and
   wherein the management system derives the virtual desktops from a common template, wherein the common template defines the virtual desktop, including an operating system, applications, indications of the additional resources for the virtual desktop, and configuration information, and wherein the management system creates the virtual desktops for the users using one or more license keys, available memory of the host machines, processing resources of the host machines, and the indications of the additional resources.

8. The computer system of claim 7, wherein the management system allows the service provider to allocate resources for multiple tenants using both the service provider managed host machines and the host machines on the separate computer network.

9. The computer system of claim 7, wherein the host machines reside in a plurality of data centers.

10. An article of manufacture comprising:
    storage in which a management system and virtual desktop patterns are stored and which configure one or more computers in a computer system to provide:
    a computer with a management system for a service provider to provision virtual desktops and manage access, by a plurality of users using client access devices, to the virtual desktops hosted on one or more host machines on a first computer network, wherein a user among the plurality of users is assigned to a virtual desktop among the virtual desktops hosted on the host machines;
    wherein the virtual desktops are allocated one or more additional resources located on a second computer network and accessed by the virtual desktops over a public computer network, each virtual desktop using authentication information for authentication with and connection to the additional resources, wherein the authentication information used by each virtual desktop is associated with the user assigned to the virtual desktop;

wherein access to the additional resources on the second computer network by the remote client access devices occurs through the virtual desktops on the host machines using the authentication information associated with the user assigned to the virtual desktop; and wherein the management system derives the virtual desktops from a common template, wherein the common template defines the virtual desktop, including an operating system, applications, indications of the additional resources for the virtual desktop, and configuration information, and wherein the management system creates the virtual desktops for the users using one or more license keys, available memory of the host machines, processing resources of the host machines, and the indications of the additional resources.

11. The article of manufacture of claim 10, wherein the virtual desktops in the configured computer system comprises virtual desktops on one or more host machines on a service provider management computer network, and virtual desktops on one or more host machines connected to a computer network that is a separate computer network than the service provider managed computer network.

12. The article of manufacture of claim 11, wherein the management system allows the service provider to allocate resources for multiple tenants using both the service provider managed host machines and the host machines on the separate computer network.

13. The article of manufacture of claim 10, wherein the host machines reside in a plurality of independent data centers.

14. The article of manufacture of claim 13, wherein the management system allows the service provider to allocate resources for each of multiple tenants using the host machines in the plurality of independent data centers.

* * * * *